July 14, 1970     T. B. ANTHONY     3,520,547
DEVICE FOR AXIALLY LOCKING A SHAFT
Filed Jan. 11, 1968
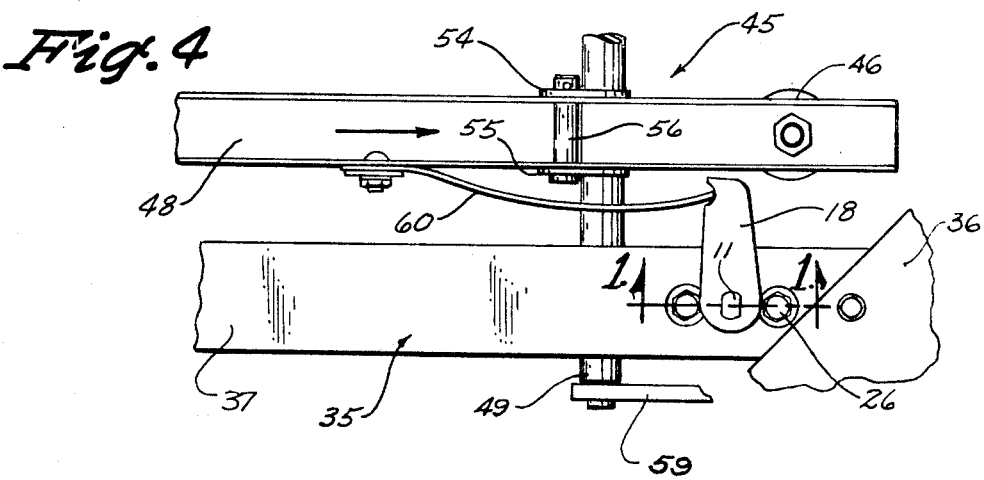
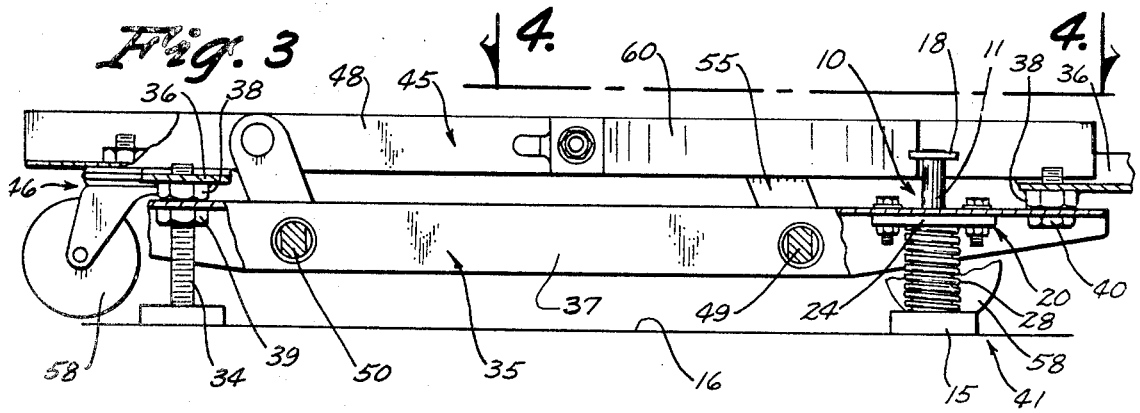
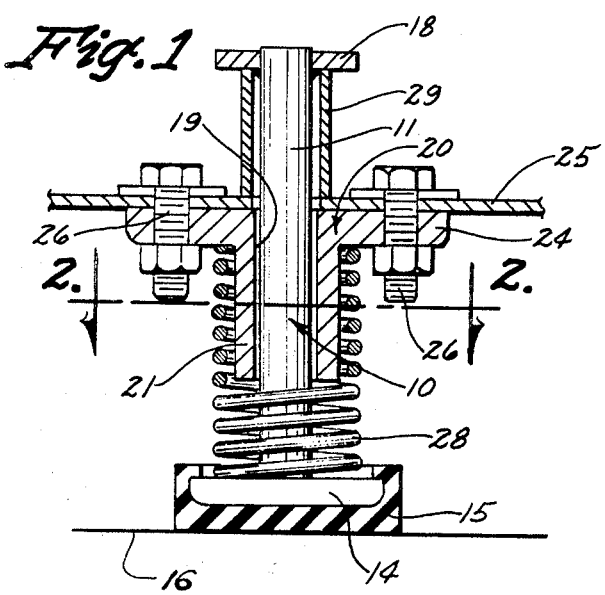
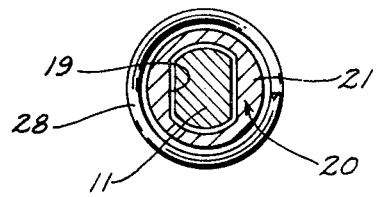
INVENTOR.
TAD B. ANTHONY
BY William G. Landwier
AGENT 3,520,547
DEVICE FOR AXIALLY LOCKING A SHAFT
Tad B. Anthony, Newton, Iowa, assignor to The Maytag
Company, Newton, Iowa, a corporation of Delaware
Filed Jan. 11, 1968, Ser. No. 697,141
Int. Cl. B62d 21/18
U.S. Cl. 280—43.24                 18 Claims

ABSTRACT OF THE DISCLOSURE

A device is disclosed for axially locking a biased axially movable shaft member responsive to the application of a torsional force on the axially movable shaft member to create a binding or frictional force between the shaft and the juxtaposed wall of a support member. In a preferred embodiment, the axially movable shaft is in the form of a spring-biased leg cooperable with three associated legs for assuming and being locked in a position determined by the engagement of the other three legs with a supporting surface.

BACKGROUND OF THE INVENTION

Field of the invention

This invention relates to shaft locking devices and more particularly to means for axially locking a spring biased shaft responsive to torsional force.

Description of the prior art

In the prior art relating to the adjustment and locking of shafts or legs, there is shown considerable activity and effort directed to providing an automatic adjusting device. A number of these devices, however, are directed to securing axial adjustment through the use of screw threads or other inclined plane camming devices. Some of the prior art relies on the weight of the supported article against a biasing force to provide a degree of locking whereas others provide locking nuts to secure the shaft in a desired position. Still other prior art shows supporting legs that are spring biased toward the supporting surface but which are lacking in locking devices to secure the leg in any given position.

Prior art also shows the locking of axially telescoping shafts through a turning action to secure interference between the shafts. There is no suggestion, however, of combining this locking means into an axially biased leg and then providing torsion means for effecting pivotal movement of the leg to effect engagement between the leg shaft and support member to lock the leg in a given axial position.

DESCRIPTION OF THE INVENTION

It is an object of the instant invention to provide an improved shaft locking device responsive to torsional force for axially locking the shaft within a supporting member.

It is a further object of the instant invention to provide an improved automatically adjustable leg member wherein the supporting leg member is axially adjustable to and lockable in a floor engaging position responsive to the application of torque.

It is still a further object of the instant invention to provide an automatically adjustable apparatus-supporting device including a plurality of leg members cooperable with an axially movable leg member biased for engagement with a floor surface and lockable in a selected position to provide a rigid support for the apparatus.

The instant invention achieves these objects through an axially movable leg assembly including a spring loaded shaft portion responsive to torsional force for locking the leg in a desired axial position.

Operation of the device and further objects and advantages thereof will become evident as the description proceeds and from an examination of the accompanying page of drawings which illustrate a preferred embodiment of the invention and in which similar numerals refer to similar parts throughout the several views.

BRIEF DESCRIPTION OF THE DRAWINGS

FIG. 1 is a longitudinal sectional view of the adjustable leg assembly embodying the instant invention as taken generally along lines 1—1 of FIG. 4;

FIG. 2 is a sectional view of the apparatus of FIG. 1 as taken along lines 2—2 of FIG. 1;

FIG. 3 is an elevational view, partly in section, showing the adjustable leg device of FIG. 1 adapted to a portable apparatus having a frame assembly for optionally supporting the device on rollers or on legs; and FIG. 4 is a fragmentary plan view of a portion of the frame assembly of FIG. 3 from a position indicated as line 4—4 in FIG. 3 and showing further details of the adjustable leg assembly of FIG. 1 and the frame assembly of FIG. 3.

DESCRIPTION OF THE PREFERRED EMBODIMENT

Referring to FIG. 1, there is shown a construction embodying the instant invention and including an adjustable leg assembly 10. The leg assembly 10 includes an axially movable shaft 11 and a foot member 14 secured as by a threaded connection at one end of the shaft 11 and covered by a cushion 15 engageable with a supporting surface 16. Secured to the other end of the shaft 11 is a locking lever 18, as best shown in FIG. 4, to which a force may be applied to cause torsion or pivoting of the shaft 11. The shaft 11 is axially movable in the central aperture 19 of a support member 20 having an elongated hub 21 defining the aperture and a flange 24 for attaching the support member 20 to a panel 25. The support member 20 is fixed to the panel 25 by a pair of threaded connectors 26.

The leg assembly 10 comprising the shaft 11, the foot 14, and the locking lever 18 is biased in the downwardly direction by a coil spring 28 and is movable downwardly to a maximum position determined by the spacer or stop 29 positioned between the panel 25 and the locking lever 18. The selection of the spring force in some embodiments will be dependent, at least in part, on the weight of the apparatus supported; in other embodiments, it will only be necessary to provide sufficient force to move the leg into engagement with the supporting surface. The leg assembly 10 is axially movable to a position allowing engagement of the foot 14 and cushion 15 with a supporting surface. The amount of movement of the leg assembly 10 is dependent upon the relative positioning of the panel 25 with respect to the supporting surface. At the suitable position, or at a selected position of the leg assembly 10, torque may be applied to the locking lever 18, either manually or automatically, to rotate or pivot the shaft 11 within the support member 20.

It will be noted in FIG. 2 that the shaft portion 11 of the leg assembly 10 is in the form of a double D cross-section and is freely movable axially within the similarly shaped aperture 19 of the support member 20. It is thus clear that a torsional force applied to and maintained on the leg assembly 10 through the locking lever 18 will cause engagement between the sides of the shaft 11 with the wall of the support member 20 and cause frictional binding to axially lock the leg 10 at the position at which the torque is applied.

This device is useful in providing support for domestic appliances such as washers or dryers which are commonly supported on four downwardly projecting supports which shall be referred to as legs. The instant invention may be utilized in conjunction with three of the commonly used threaded leg members 34 and a relatively fixed supporting frame 35 as shown in FIG. 3. A pair of spaced apart channel members, such as channel 37, are joined to form the substantially rigid frame 35 as will be more fully described hereinafter. The apparatus (not shown) is fixed to or at least mounted on the fixed supporting frame 35 through a plurality of corner gussets or brackets 36 secured to the ends of channels 37. Three legs 34 penetrate the fixed frame 35 and are threadingly connected to the weld nuts 38 attached to the brackets 36. A loose nut 39 is tightened against the fixed frame 35 to secure it and to lock the legs 34 in a selected position. A bolt 40 is used in lieu of a fourth threaded leg. The fourth movable leg device 41 uses the instant invention and is also mounted on the fixed supporting frame 35. In such a use, the three fixed legs 34 will become engaged with the floor or other supporting surface 16 to establish a position for the fixed supporting frame 35 by a three point suspension. With the fourth leg device 41 being of the axially movable downwardly biased type shown in FIG. 1, the foot 14 and cushion 15 will move axially into engagement with the floor. A torque is then applied and maintained on the leg assembly 10 to lock the leg assembly 10 in the floor engaging position. As indicated hereinabove, the downward biasing force on the leg assembly 10 is established so that the movable leg 10 will engage the floor with sufficient force so that the three fixed legs will firmly engage the surface and so that the load of the apparatus is substantially distributed between the four legs.

This use of three relatively fixed legs 34 with the one axially movable leg device 41 is advantageous in supporting an apparatus on an uneven floor or upon one in which there is a wide variation in degree of resiliency. Under such adverse conditions, the three fixed legs 34 will firmly engage the supporting surface, under urging of the biased leg 41 in some instances, and will establish a position for the fixed supporting frame 35. The axially movable biased leg 41 will firmly engage the supporting surface without changing the position of the fixed supporting frame 35 as determined by the fixed legs 34 and will be locked to provide a firm four point suspension for the apparatus.

The instant invention is also useful in an apparatus having options of portability or stationary mounting. Such a device will include a fixed frame 35 for supporting the apparatus as shown in FIG. 3 and discussed hereinabove. The fixed supporting frame 35 will carry the leg members, three of which may be threaded into the fixed frame 35 as shown in FIG. 3, whereas the fourth leg device 41 may comprise the adjustable leg 10 shown in FIG. 1. This frame and leg assembly will function substantially as previously discussed. In this embodiment the fixed supporting frame 35 will additionally carry a movable caster frame 45 operable between upper and lower positions for selectively engaging the floor and supporting the apparatus on a plurality of caster assemblies 46. In the embodiment shown in FIGS. 3 and 4, the movable caster frame 46 consists of a pair of channels 48, only one of which is shown in FIGS. 3 and 4, and which are joined through a pair of pivotal shafts 49, 50 that also support the movable caster frame 45 on the fixed frame 35.

The pivotal shaft 49, forming part of the fixed frame 45, is pivotally supported at its ends by the channels 37. Intermediate the ends of the shaft 49 are two pairs of linkage plates such as the pair 54, 55 that are welded, for example, to the shaft 49. These linkage plates 54, 55 receive a pivot pin 56 that penetrates the two flanges of one end of the channel 48 to pivotally support the channel 48 for movement relative to the fixed frame 35.

Each channel 48 carries a caster assembly 46 at each end that is engageable with the supporting surface in the lower position of the movable caster frame 45. Each caster assembly 46 includes a roller, wheel, or ball type member 58 for movably supporting the apparatus and is securely attached to the channel 48.

The movable caster frame 45 may be manually actuated for movement between the upper and lower positions. Torque may be applied through a shift lever 59 assembled to the end of the shaft 49 for rotating the linkage plates 54, 55 in a counterclockwise direction about the axis of shaft 49, as shown in FIG. 3, to move the movable caster frame 45 and caster assemblies 46 downwardly toward the floor 16. Continued movement will effect engagement of the casters 46 and disengagement of the legs 34, 41 so that the apparatus is supported on the casters 46. The shift lever 59 may be secured by latching means (not shown) in the extreme positions to maintain the movable frame 45 in the selected position and to lock the leg 41 when the frame 45 is in the up position.

During operation of the apparatus, the caster assemblies 46 should be raised so that the apparatus is more rigidly supported on the plurality of leg members. Upon reverse, or clockwise, operation of the pivot shaft 49 through movement of lever 59 toward the opposite extreme for raising the movable caster frame 45, the apparatus and fixed frame 35 will lower so that the leg assemblies will engage the supporting surface. The apparatus will become supported on the three relatively fixed legs 34; the fourth adjustable leg assembly 10 will have engaged the floor 16 and become adjusted within the support member 20 to a position determined by the position of the fixed frame 35.

Continued movement of the movable caster channel 48 in the upward direction will move the elongated spring 60 attached to the channel 48 toward the locking lever 18 so that a force will be applied to the locking lever 18 tending to rotate the leg assembly 10 within the support member 20. The elongated spring 60 will act as a long column to provide substantially uniform loading after initial engagement. This torque will cause a binding action between the shaft 11 and the wall of the leg support member 20 to axially lock the leg assembly 10 in the position assumed after engagement of the fixed leg members 34 with the supporting surface 16. The lever 59 will be latched in the extreme position to maintain a force on the lever 18.

It is thus clear that the instant invention provides an automatically adjustable and lockable leg assembly particularly useful in supporting an apparatus on an irregular surface and further useful in an apparatus that is optionally portable but which must be more rigidly supported during operation. One embodiment of the device shown automatically seeks its position and then is locked into the assumed position by continued movement of the movable caster frame.

In the drawings and specification, there has been set forth a preferred embodiment of the invention and, although specific terms are employed, these are used in a generic and descriptive sense only and not for purposes of limitation. Changes in form and the proportion of parts as well as the substitution of equivalents are contemplated as circumstances may suggest or render expedient, without departing from the spirit or scope of this invention.

I claim:

1. A leg locking device, comprising: a support member having an aperture formed therein; a leg having a shaft portion disposed at least partially within said aperture, one of said support member and said shaft portion being axially movable relative to the other; biasing means for effecting relative axial movement between said support member and said leg; and means for applying and maintaining torque on one of said support member and said leg to effect relative pivotal movement between said support member and said shaft portion, said pivotal movement effecting engagement between said support member and said shaft portion for axially locking said leg and said support member.

2. A leg locking device, comprising: a support member; a leg member engageable with a supporting surface, one of said support member and said leg member defining an aperture and the other of said support member and said leg member having a shaft disposed at least partially within said aperture and axially movable along an axis penetrating said aperture; spring means for axially biasing said leg member relative to said support member and into engagement with said supporting surface; and selectively operable means for applying and maintaining a torque about said axis to effect a binding action between said aperture and said shaft for axially locking said leg member in the axial position of engagement with the supporting surface.

3. A leg locking device as defined in claim 2 wherein said aperture is non-circular and said shaft substantially mates with said aperture and wherein said shaft is normally freely movable axially and becomes axially locked within said aperture upon application of said torque.

4. A leg locking device as defined in claim 3 wherein said support member includes a longitudinally extending hub portion defining said aperture in the form of a sleeve supporting said shaft and engageable with said shaft upon said application of torque to frictionally retain said shaft axially with respect to said support member.

5. A leg locking device as defined in claim 3 wherein said support member is relatively fixed and wherein said torque is selectively applied to and maintained on said leg member for axially retaining said shaft relative to said support member.

6. A leg locking device, comprising: a support member having a non-circular aperture formed therein; a leg member engageable with a supporting surface and having a shaft portion passing through said aperture and axially movable along an axis penetrating said aperture; means for axially biasing said leg member toward engagement with said supporting surface; and means for applying and maintaining torque about said axis to effect a binding action between said support member and said shaft portion for axially locking said leg member at a selected axial position.

7. A leg locking device as defined in claim 6 wherein said supporting member is relatively fixed and includes a longitudinally extending hub portion supporting said leg member and wherein said torque is applied to and maintained on said leg member for effecting said binding action between said shaft portion and said support member.

8. Means for supporting an apparatus on a surface, comprising: a frame; means including three legs projecting from the frame and engageable with said surface for substantially fixedly positioning said frame; means attached to said frame for defining an aperture; a movable leg member having a shaft portion axially movable along an axis penetrating said aperture; means for axially biasing said movable leg member into engagement with said surface upon positioning of said frame by said three legs; and means for applying and maintaining torque on said movable leg member after said engagement with said surface to effect a binding action between said shaft portion and said aperture for axially locking said movable leg member.

9. Means for supporting an apparatus as defined in claim 8 wherein said aperture and said shaft portion substantially interlock to normally allow sliding axial movement of the leg member with respect to the aperture and to selectively effect said binding action upon said application of torque on said leg member.

10. Means for supporting an apparatus on a surface as defined in claim 8 wherein the surface is substantially horizontal and wherein said three legs initially carry the weight of the apparatus and wherein the biasing means is sufficient to condition said movable leg member for substantially equalizing the load distribution between the four legs after said axial locking.

11. Means for supporting an apparatus on a surface as defined in claim 8 and further including caster means mounted on said frame and including a plurality of casters engageable with said surface for movably supporting said apparatus on said surface and wherein said three legs are disengaged from said surface upon engagement of said caster means with said surface and further including means for effecting selective engagement and disengagement of said caster means and said three legs with said surface and wherein said movable leg member is biased into engagement with said surface upon engagement of said surface by said three legs and prior to application of said torque on said leg member.

12. Means for supporting an apparatus as defined in claim 11 wherein said caster means is movably supported on said frame and operable between a first position in which said casters are engaged with said surface for supporting said apparatus and a second position in which said casters are elevated above said surface for effecting engagement of said three legs with said surface and wherein said axial biasing means moves said movable leg into engagement with said surface.

13. Means for supporting an apparatus as defined in claim 12 wherein said means for applying and maintaining torque is actuated by the terminal movement of said caster assembly to said second position.

14. Means for supporting an apparatus as defined in claim 12 wherein said means for applying and maintaining torque includes a columnar spring attached to said caster means and operable for applying a substantially uniform torque on said movable leg member as the caster assembly is moved to said second position.

15. Means for supporting an apparatus on a substantially horizontal surface comprising: a frame for supporting said apparatus; a caster assembly mounted on said frame and including a plurality of casters engageable with said surface for movably supporting said frame and said apparatus; means including three legs mounted on and projecting downwardly from said frame and disengaged from said surface with said caster assembly engaged with said surface; means for effecting disengagement of said casters from said surface and for effecting engagement of said three legs with said surface and positioning of said frame with respect to said surface; means attached to said frame defining an aperture; a movable leg member having a shaft portion axially movable along an axis penetrating said aperture; means for axially biasing said movable leg member into engagement with said surface upon positioning of said frame by said three legs; and means for applying and maintaining torque to said movable leg member after said engagement with said surface to effect a binding action between said shaft portion and said aperture for axially locking said movable leg member.

16. Means for supporting an apparatus on a substantially horizontal surface comprising: a frame for supporting said apparatus; a caster assembly mounted on said frame and including a plurality of casters engageable with said surface for movably supporting said frame and said apparatus with said caster assembly in a first position; means including three legs mounted on and projecting downwardly from said frame and disengaged from said surface with said caster assembly in said first position; said caster assembly being movable from said first position to a second elevated position for effecting engagement of said three legs with said surface and positioning of said frame with respect to said surface; a support member attached to said frame and defining an aperture therein; a movable leg member engageable with said surface and having a shaft portion axially movable in said aperture along an axis penetrating said aperture; means for axially biasing said movable leg member into engagement with said surface with said frame positioned as determined by said three legs; and means for applying and maintaining torque to said movable leg member after said engagement with said surface to effect a binding action between said shaft portion and said supporting member for axially locking said movable leg member.

17. Means for supporting an apparatus as defined in claim 16 wherein said torque means is actuated by the terminal movement of said caster assembly to said second position.

18. Means for supporting an apparatus as defined in claim 16 wherein said torque means includes a columnar spring attached to said caster assembly and operable for engaging and applying a substantially uniform torque on said movable leg member as the caster assembly is moved to said second position.

References Cited

UNITED STATES PATENTS

| 3,098,669 | 7/1963 | Fortin. | |
|---|---|---|---|
| 3,191,895 | 6/1965 | Whelan | 248—188.3 |
| 2,964,327 | 12/1960 | Mohr | 280—43.24 |

FOREIGN PATENTS 793,002   10/1934   France.

BENJAMIN HERSH, Primary Examiner

R. R. SONG, Assistant Examiner

U.S. Cl. X.R.

248—188.3